Aug. 22, 1961 F. J. GERTKEN ET AL 2,997,048
CLEANING DEVICE FOR GROCERY CARTS
Filed Sept. 29, 1958 2 Sheets-Sheet 1
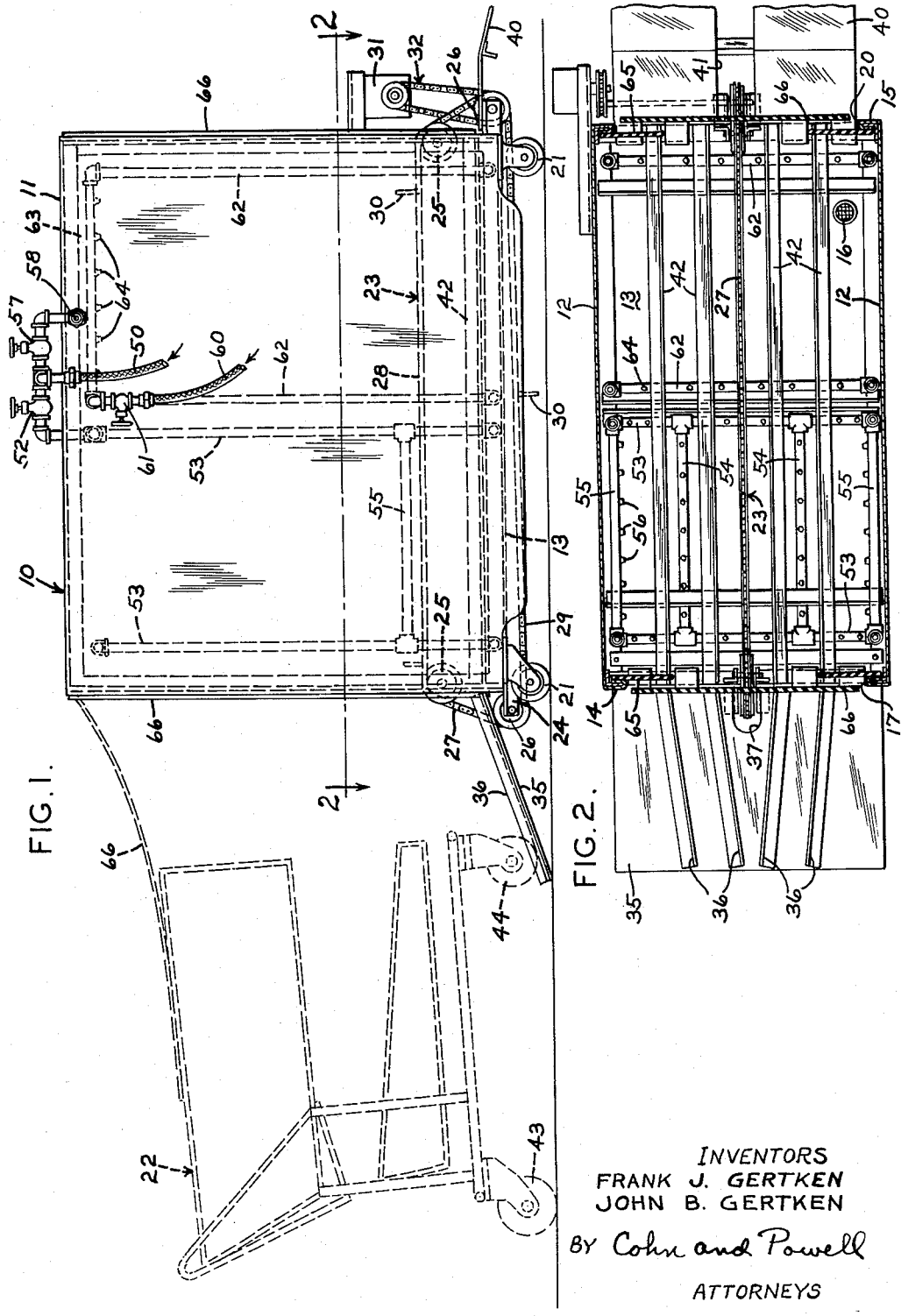
INVENTORS
FRANK J. GERTKEN
JOHN B. GERTKEN
BY Cohn and Powell
ATTORNEYS Aug. 22, 1961    F. J. GERTKEN ET AL    2,997,048
CLEANING DEVICE FOR GROCERY CARTS
Filed Sept. 29, 1958    2 Sheets-Sheet 2

INVENTORS
FRANK J. GERTKEN
JOHN B. GERTKEN

BY Cohn and Powell
ATTORNEYS

United States Patent Office 2,997,048
Patented Aug. 22, 1961

2,997,048
CLEANING DEVICE FOR GROCERY CARTS
Frank J. Gertken and John B. Gertken, both of 9461 Brenda Ave., St. Louis 23, Mo.
Filed Sept. 29, 1958, Ser. No. 763,958
5 Claims. (Cl. 134—72)

This invention relates generally to improvements in a cleaning device, and more particularly to an improved device adapted for cleaning grocery carts.

In present day grocery stores and super-markets, there are provided for the customers' convenience, grocery carts adapted to hold the items selected and purchased. These carts become dirty in time, and it is only good sanitation practice to have the carts cleaned at regular periodic intervals. Heretofore such carts were scrubbed and washed manually.

It is an important objective to provide an apparatus that is adapted specifically to clean grocery carts quickly and easily with a fully automatic operation.

Another important object is realized by the provision of an enclosure in which piping is enclosed for spraying the cart with steam and water, and in which a conveyor means is mounted for transporting such cart through an entrance opening at one end of the enclosure, through the enclosure interior and out the exit opening at the opposite end, all incident to cleaning operation.

Still another important object is achieved by the structural arrangement of tracks on both sides of the conveyor means on which the carts run while being transported through the cleaning zone.

Yet another important object is realized by providing guide means on a ramp leading to the track elements at the entrance opening which assures proper alignment of the cart and assures connection to the conveyor means.

Other important advantages are achieved by the provision of particular sealing means for the entrance and exit openings of the cleaning enclosure, which minimizes loss of steam and water during movement of the cart into, through and out of the enclosure.

Another important object is realized by the structural arrangement of the conveyor means so that it fastens to the cart as the cart moves up the ramp, carries the cart through the entrance opening and through the enclosure and detaches automatically as the cart is discharged through the exit opening.

Another important object is provided by the improved structural arrangement of piping in the enclosure which assures cleaning of all parts of the cart, and which performs most advantageously and efficiently in first cleaning the cart with mixture of steam and hot water to which a detergent is added, and then rinsing it with cold water.

An important object is realized in making a device of this type which is durable in construction, efficient in operation and economical to manufacture and use.

The foregoing and numerous other objects and advantages of the invention will more clearly appear from the following detailed description of a preferred embodiment, particularly when considered in connection with the accompanying drawings, in which:

FIG. 1 is a side elevational view of the cleaning device, the grocery cart being illustrated in broken lines to more clearly show the purpose and function of such device;

FIG. 2 is a view, partly in cross section, as seen along line 2—2 of FIG. 1;

Figure 3:
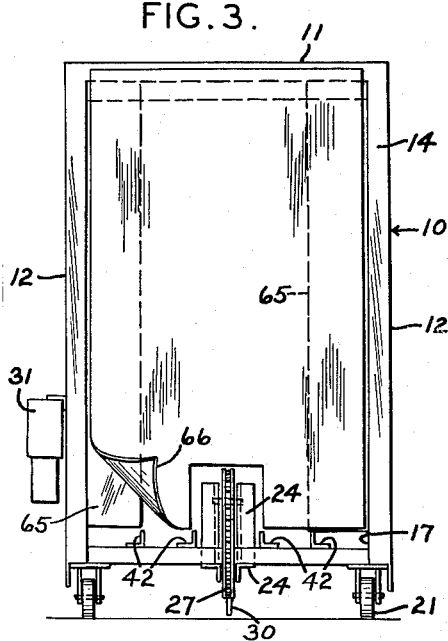
FIG. 3 is an end elevational view of the cleaning device as seen from the left of FIG. 1.
Figure 4:
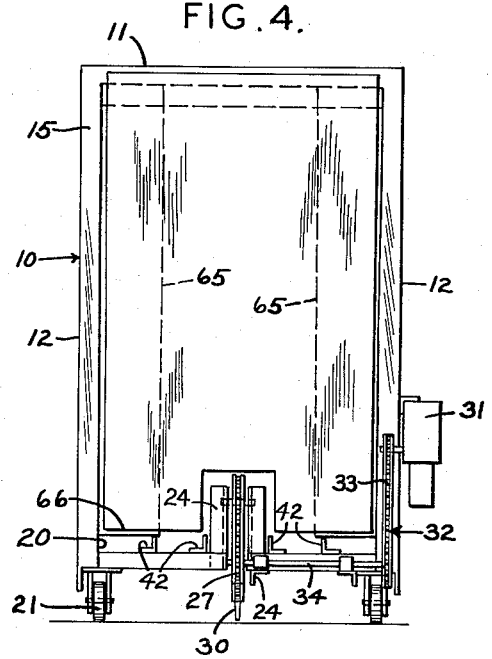
FIG. 4 is an end elevational view of the cleaning device as seen from the right of FIG. 1.

Referring now by characters of reference to the drawings, it is seen that the cleaning device includes an enclosure generally indicated at 10, having a top wall 11, side walls 12, a bottom wall 13 and end walls 14 and 15. The bottom wall 13 is tilted slightly, and a drain 16 is provided therethrough at its lowermost corner. The end wall 14 is provided with an entrance opening 17, and the opposite end wall 15 is provided with an exit opening 20. The enclosure 10 is mounted on wheels 21 to facilitate movement of the device to the location where it can be most advantageously utilized.

A typical grocery cart is illustrated by broken lines in FIG. 1, and referred to generally at 22. The cleaning device is particularly adapted to cleanse such a cart.

Mounted on enclosure 10 is a conveyor means referred to at 23. Frame members 24 (FIGS. 3 and 5) of the enclosure 10 serve to hold pulleys 25 and 26 at each end of the enclosure. An endless V-type link belt 27 preferably made of leather, is mounted on pulleys 25 and 26. Because of the particular disposition of pulleys 25 and 26, one flight 28 of belt 27 extends through the enclosure from the entrance opening 17 to the exit opening 20. The belt 27 extends through the openings 17 and 20 and includes a second flight 29 that is disposed below the bottom wall 13 of the enclosure. The conveyor means 23 is located centrally of the enclosure 10 and extends along the longitudinal axis.

Figure 5:
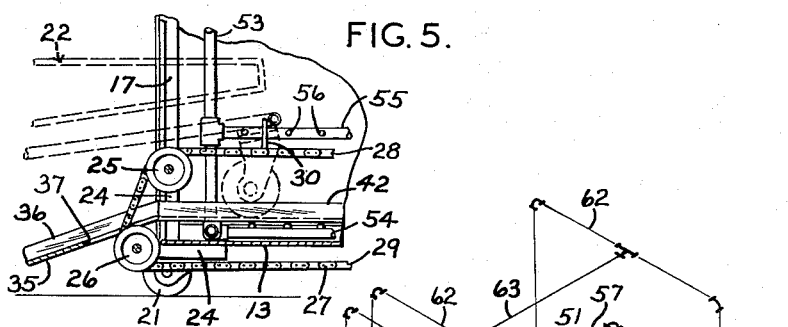
FIG. 5 is a fragmentary view, partly in cross section, as seen along the medial longitudinal axis of the device at the entrance opening, illustrating the connection of the conveyor means with the cart.

The belt 27 is provided with a plurality of fingers 30 that project outwardly to engage the frame-work of cart 22 as is best illustrated in FIG. 5 so as to transport the cart through the entrance opening 17, through the enclosure 10 and through the exit opening 20.

A power means 31 is mounted on enclosure 10 and is connected to the pulley 26 at the exit end of the enclosure by a drive connection 32 consisting of a belt 33 and a cross shaft 34.

Attached to the bottom of enclosure 10 is a front ramp 35 that extends upwardly from the ground to the entrance opening 17. Guide elements 36 in the form of angles are attached to the front ramp 35, the guide elements 36 extending divergently upwardly on the ramp 35 on opposite sides of the conveyor belt 27. The ramp 35 is provided with an opening 37 through which the conveyor belt 27 extends.

Similarly, a rear ramp 40 is attached to the opposite end of enclosure 10, the ramp 40 extending downwardly from the exit opening 20 to the ground. An opening 41 is provided in rear ramp 40 through which the conveyor belt 27 extends.

Track elements 42 in the form of angles are disposed on opposite sides of the conveyor belt 27 and are extended the length of the enclosure 10 from the entrance opening 17 to the exit opening 20. The track elements 42 are aligned with the guide elements 36 at the entrance opening 17. Because the rear wheels 43 (FIG. 1) of this particular type of cart 22 are spaced apart a greater distance than are front wheels 44, a pair of guide elements 36 and track elements 42 are provided on each side of the conveyor means 23. The guide elements 36 and track elements 42 closest to the conveyor means are utilized to guide and support the front cart wheels 44, while the outermost guide elements 36 and track elements 42 are adapted to guide and support the rear cart wheels 43.

It is usual that carts of this type have wheels that swivel. Therefore, guide elements 36 are inclined in divergent relation as is illustrated best in FIG. 2, so as to straighten out the wheels 43—44 and guide them directly onto the track elements 42 at the entrance opening 17.

For reasons which will best appear later during subsequent description of parts, the track elements 42 are attached to the frame of the enclosure 10 and held in spaced relation above the bottom wall 13.

Figure 6:
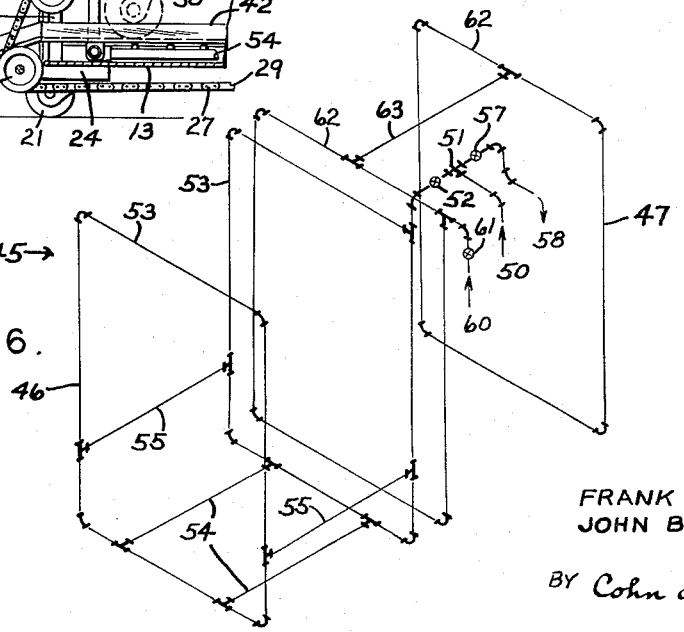
FIG. 6 is a diagrammatic view of the piping system utilized in the enclosure.

Disposed about the interior of the enclosure 10 is a system of piping generally indicated at 45 and best shown diagrammatically in FIG. 6. This piping system 45 consists of two parts, i.e., a wash system 46 and a rinse system 47. The inlet to the wash system 46 is illustrated by line 50 leading through a T-connection 51 and through valve 52 to an arrangement of pipes consisting of a pair of rectangular forms 53 interconnected by a pair of lowermost cross pipes 54 and a pair of side cross pipes 55. The lowermost portions of rectangular pipe forms 53 and lowermost cross pipes 54 are disposed in the space between the track elements 42 and the bottom wall 13. The pipes constituting the wash system 46 are provided with a plurality of nozzles 56 directed inwardly through which a mixture of steam and hot water to which a detergent is added is sprayed onto the cart moving through such piping 45.

Connected to the T-connection 51 is a valve 57 leading to a discharge pipe 58 that can be connected, if desired, to a hand-operated steam cleaner that is not illustrated since it forms no direct part of this invention.

The inlet to the rinse system 47 is through line 60 and valve 61 to a pair of rectangular pipe forms 62 interconnected by a top cross pipe 63. Similarly, the lowermost portions of rectangular pipe forms 62 are located in the space between track elements 42 and bottom wall 13. The pipes 62 and 63 are provided with a plurality of nozzles 64 directed inwardly through which cold water is sprayed on the cart 22 passing therethrough.

For the best cleaning operation, the wash system 46 is located immediately adjacent the entrance opening 17 and the rinse system 47 is located immediately adjacent the exit opening 20. This arrangement provides that the cart is first cleaned with steam and hot water and then rinsed with cold water.

At each side of entrance opening 17 and of exit opening 20 is a resilient flap 65 extending substantially the height of such opening adapted to engage the side of the cart as it passes through the enclosure 10. A curtain 66 is attached to the top of the enclosure at each end and is disposed over the entrance opening 17 and the exit opening 20, the curtain 66 being arranged in overlapping relation to the resilient side flaps 65. The flaps 65 and curtains 66 provide effective closures for the end openings of the enclosure 10 and serve to minimize the loss of steam and water through such openings.

It is thought that the operation of the cleaning device has become fully apparent from the foregoing detailed description of parts, but for completeness of disclosure it will be noted that the piping system 45 is first operatively connected to the steam and water supply.

For example, line 50 is connected to the steam and hot water supply. Valve 56 is closed, assuming that the hand cleaner is not being utilized, and the valve 52 is opened to enable discharge of steam, hot water and detergent through the nozzles 56. Similarly, the line 60 is connected to the cold water supply and valve 61 opened to enable cold water to be sprayed through nozzles 64 in the rinse system 47.

Power means 31 is actuated so as to drive the conveyor chain 27 in a clockwise direction as seen in FIG. 1.

Then, the curtain 66 covering the entrance opening 17 is raised and the grocery cart 22 is rolled upwardly on the ramp 35. The guide elements 36 guide the wheels 43—44 onto the tracks 42. As the cart 22 reaches the entrance opening 17, the projecting finger 30 on the conveyor belt 27 engages the cart frame and pulls the cart through the entrance opening 17 and transports it along the track elements 42 through the enclosure 10.

The cart 22 is first cleaned by the spray of steam, hot water and detergent through the wash system 46 immediately adjacent the entrance opening 17. Upon further travel through the enclosure 10 the cart is thoroughly rinsed with cold water that is sprayed through the nozzles 64 of the rinse system 47 immediately adjacent the exit opening 20. Then the finger 30 of conveyor belt 27 delivers the cart 22 through the exit opening 20 and automatically disengages from the cart frame. The cart moves down the rear ramp 40 completely reconditioned and ready for subsequent use.

The water discharged into the enclosure 10 falls to the bottom wall 13 and is discharged through the drain 16.

It will be seen that because portions of the wash system 46 and the rinse system 47 are disposed below the track elements 42 into the space between the track elements 42 and the bottom wall 13, that the underside of the cart 22 is more thoroughly cleaned.

Although the invention has been described by making detailed reference to a single preferred embodiment, such detail is to be understood in an instructive, rather than in any restrictive sense, many variants being possible within the scope of the claims hereunto appended.

We claim as our invention:

1. A cleaning device for grocery carts comprising an enclosure having an entrance opening at one end and an exit opening at the opposite end, and having a bottom wall with a drain therethrough, a conveyor means mounted on said enclosure, the conveyor means including a belt having one flight extending through the enclosure and through said openings and a second flight disposed below said bottom wall, finger means on said belt projecting outwardly to engage a cart and transport it through the enclosure, power means on said enclosure, a drive connection between said power means and said belt, track elements disposed at the bottom of the enclosure and disposed on opposite sides of the conveyor means, the track elements extending from the entrance opening to the exit opening, a ramp at one end of the enclosure leading to the entrance opening, guide elements on said ramp leading from the bottom to the top of the ramp on opposite sides of the conveyor means into alignment with the said track elements, the guide elements being disposed divergently upwardly on the ramp to the track elements, and piping within the enclosure including spray nozzles for cleaning the cart incident to movement through said enclosure.

2. A cleaning device for grocery carts comprising an enclosure having top, bottom and side walls, the enclosure including opposite ends provided with an entrance opening and an exit opening, a conveyor means disposed at the bottom of the enclosure and extending from the entrance opening to the exit opening, the conveyor means including an element adapted to engage the cart and transport it through the enclosure, means within the enclosure for cleaning the cart, resilient flaps attached to the enclosure along the sides of each of said openings adapted to engage the cart passing therethrough, said side flaps of each opening extending inwardly yet disposed in spaced relation, and a curtain attached to the enclosure and hanging over each opening in overlapping relation to said side flaps and the space between said side flaps.

3. A cleaning device for grocery carts comprising an enclosure having top, bottom and side walls, the enclosure including opposite ends provided with an entrance opening and an exit opening, a conveyor means disposed at the bottom of the enclosure including an endless belt having one flight extending through said enclosure and through said openings and having a second flight extending below the bottom wall, finger means on said conveyor belt adapted to engage the cart and transport it through the enclosure, resilient flaps attached to the enclosure along the sides of each of said openings adapted to engage the cart passing therethrough, a curtain attached to the enclosure and hanging over each opening in overlapping relation to said side flaps, ramps leading to said entrance opening and leading from said exit opening, the ramps and curtains having openings through which the conveyor belt extends, and piping located about the interior of said enclosure, the piping including a wash system located adjacent the entrance opening and a rinse system adjacent the exit opening.

4. A cleaning device for grocery carts comprising an enclosure having an entrance opening at one end and an exit opening at the opposite end, a conveyor means disposed at the bottom of the enclosure and extending from one opening to the other, the conveyor means including an element adapted to engage the cart and transport it through the enclosure, track elements at the bottom of the enclosure and disposed on opposite sides of the conveyor means, the track element extending from the entrance opening to the exit opening, a ramp at one end of the enclosure leading to the entrance opening, guide means consisting of upstanding guide elements diverging upwardly on the ramp to the track elements on opposite sides of the conveyor means, and means within the enclosure for cleaning the cart.

5. A cleaning device for grocery carts comprising an enclosure having top, bottom and side walls, the enclosure including opposite ends provided with an exit opening and an entrance opening, a front ramp leading to the entrance opening, a rear ramp leading from the exit opening, means within the enclosure for cleaning the cart, resilient flaps attached to the enclosure along the side of each of said openings adapted to engage the cart passing therethrough, a curtain attached to the enclosure and hanging over each opening in overlapping relation to said side flaps, an endless conveyor belt having one flight extending through the enclosure and through said openings and having a second flight extending below the enclosure, the ramp and curtain having openings through which the conveyor belt extends, and an element on the conveyor belt adapted to engage the cart and transport it through the enclosure.

References Cited in the file of this patent

UNITED STATES PATENTS

| | | |
|---|---|---|
| 1,206,120 | McCue | Nov. 28, 1916 |
| 1,512,918 | Forsgard | Oct. 28, 1924 |
| 1,640,693 | Couch | Aug. 30, 1927 |
| 1,826,460 | Coutin | Oct. 6, 1931 |
| 1,841,900 | Lunati | Jan. 19, 1932 |
| 2,017,677 | Webb | Oct. 15, 1935 |
| 2,543,684 | Blanchard | Feb. 27, 1951 |
| 2,596,686 | Hess | May 13, 1952 |
| 2,619,099 | Young | Nov. 25, 1952 |
| 2,644,473 | Fox | July 7, 1953 |
| 2,649,100 | Frech | Aug. 18, 1953 |
| 2,857,922 | Effinger | Oct. 28, 1958 |

FOREIGN PATENTS

| | | |
|---|---|---|
| 183,349 | Germany | Mar. 18, 1907 |

OTHER REFERENCES

Railway Age, Dec. 5, 1955, page 61.